Oct. 14, 1930.  E. R. MARTIN  1,778,222
MACHINE FOR MAKING BUILDING MATERIALS
Filed Aug. 2, 1928    12 Sheets-Sheet 1
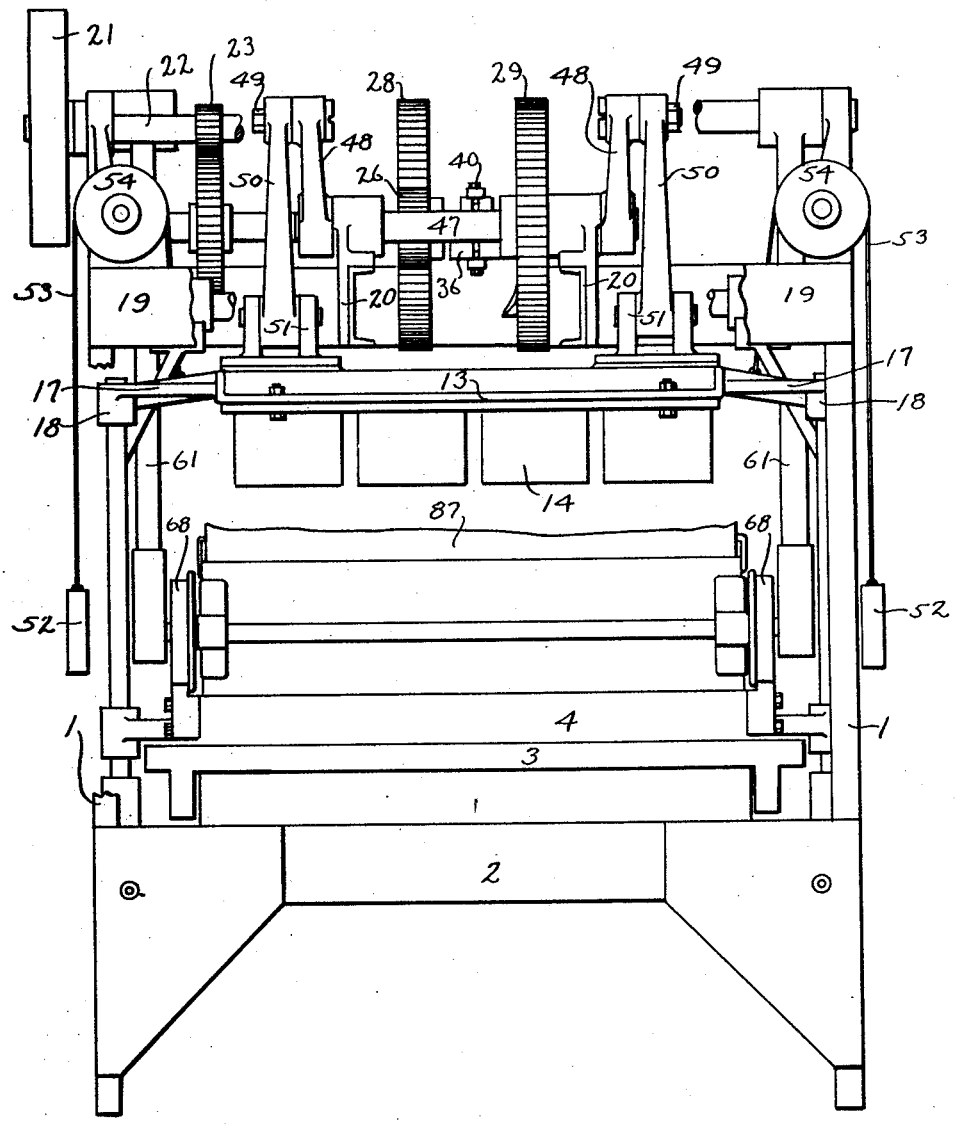
INVENTOR
Elmer R. Martin
BY Toulmin + Toulmin
ATTORNEY

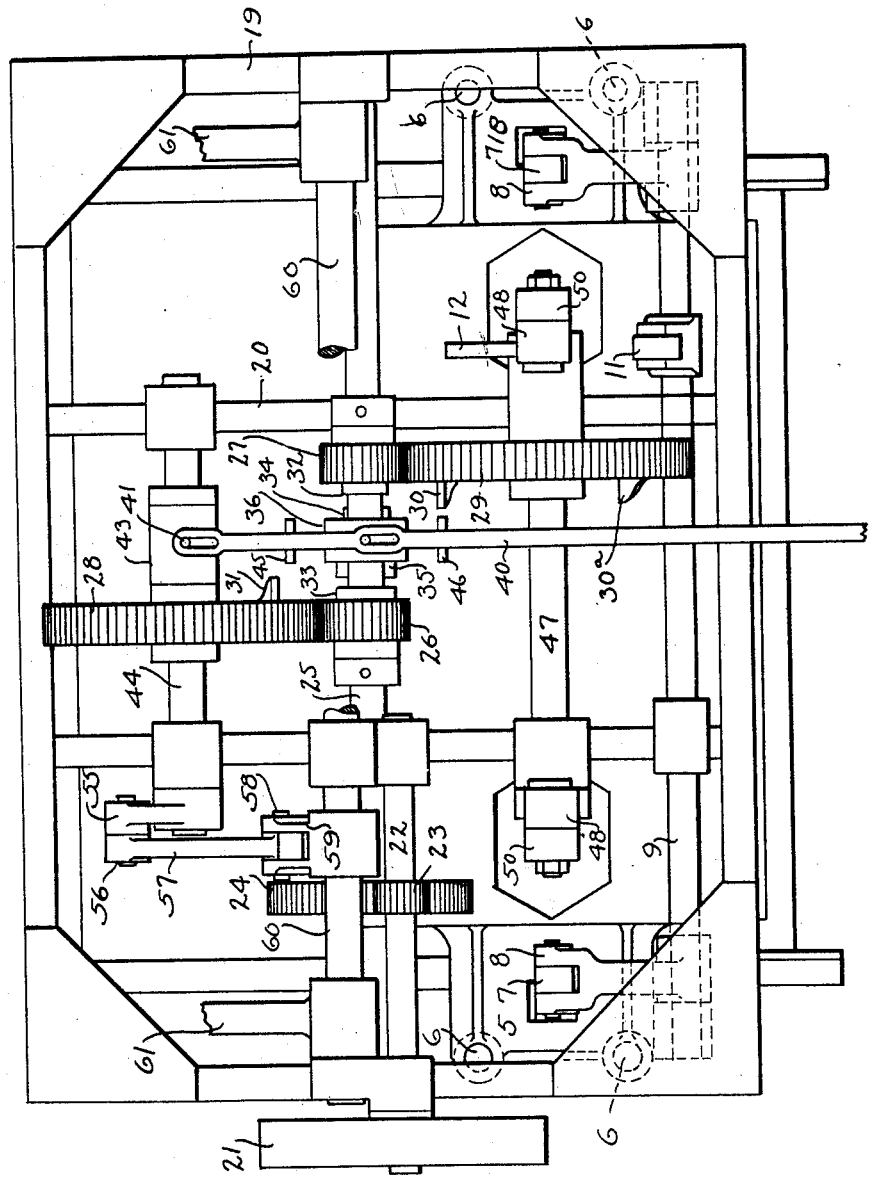

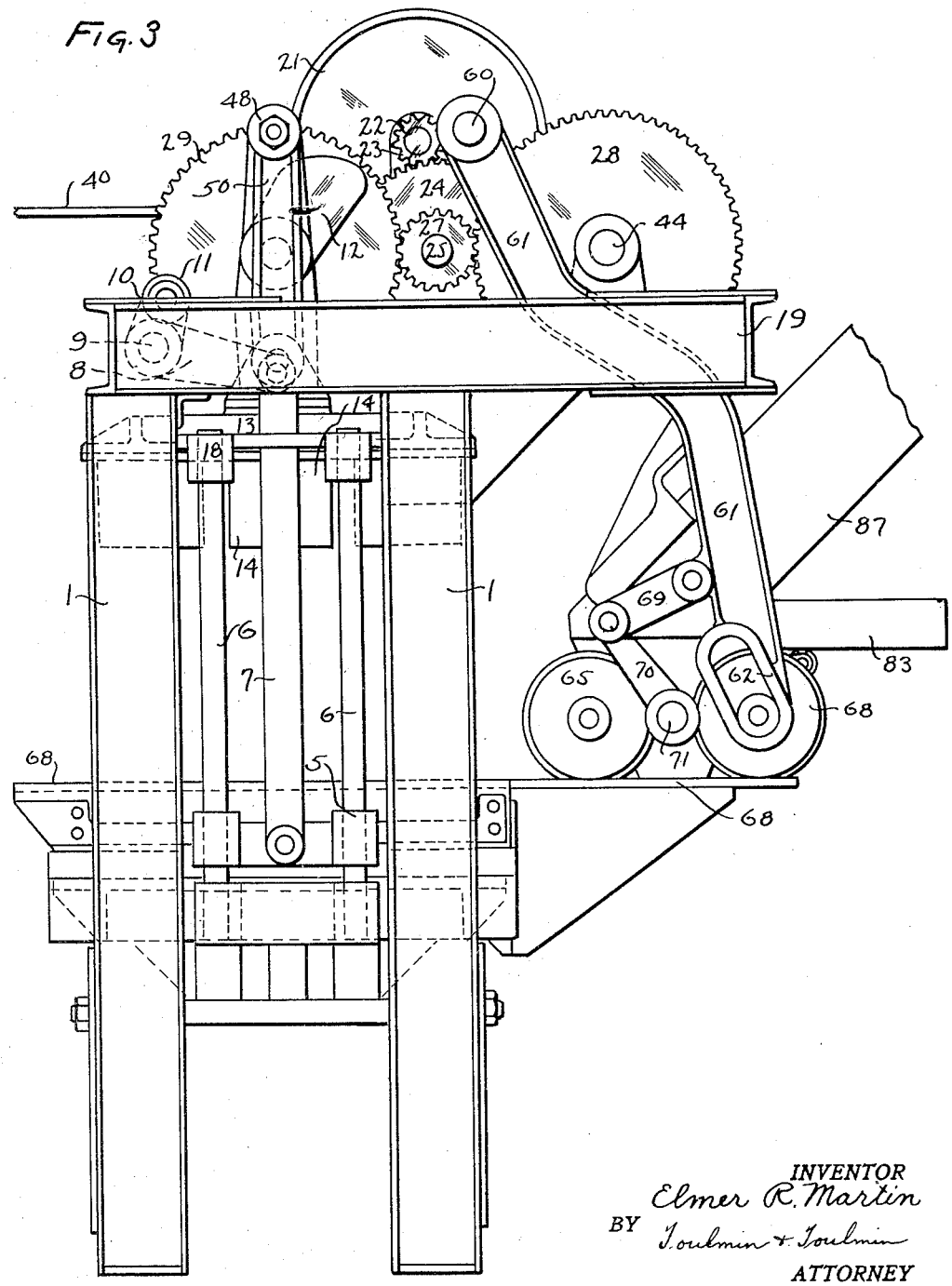

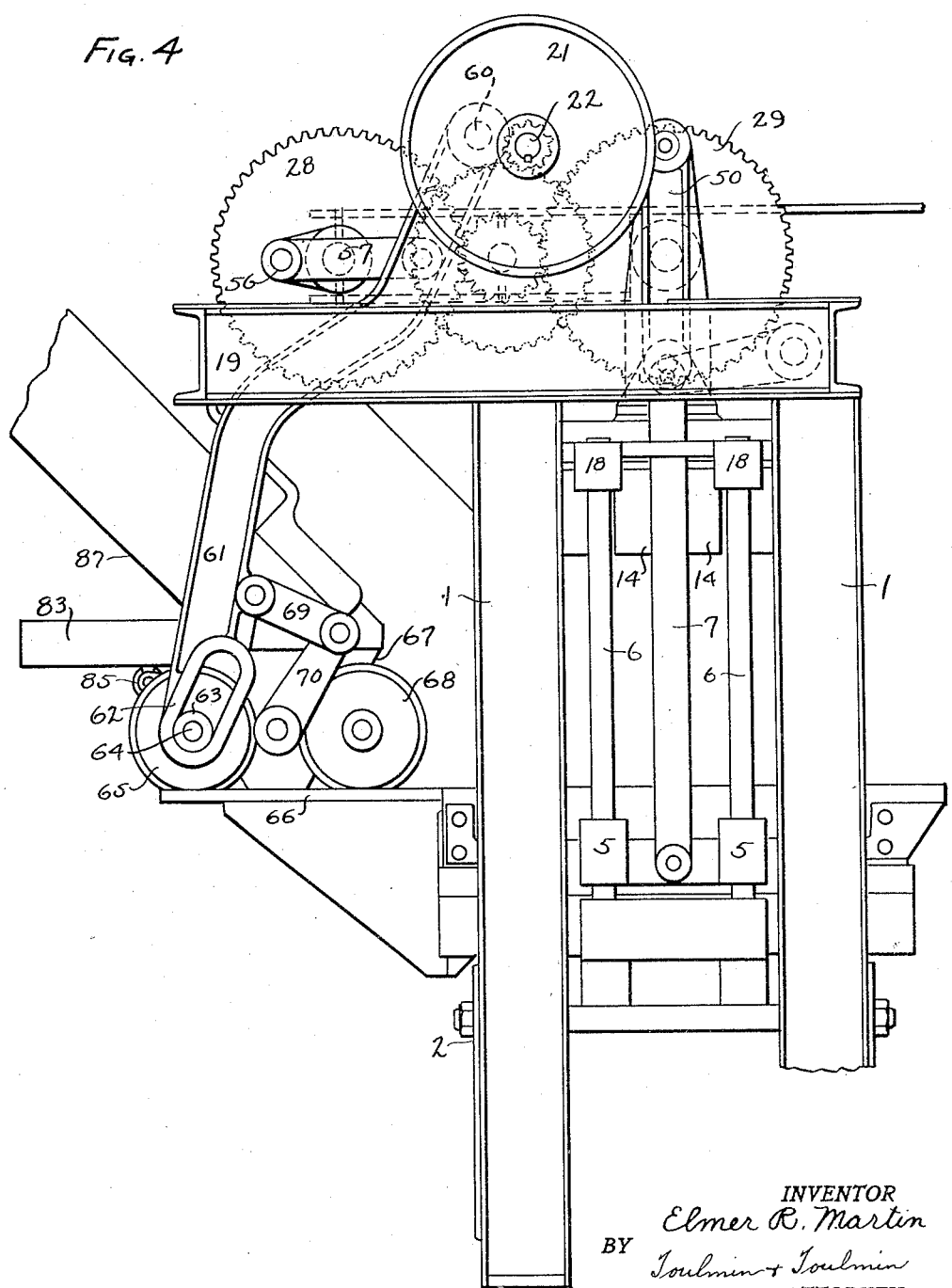

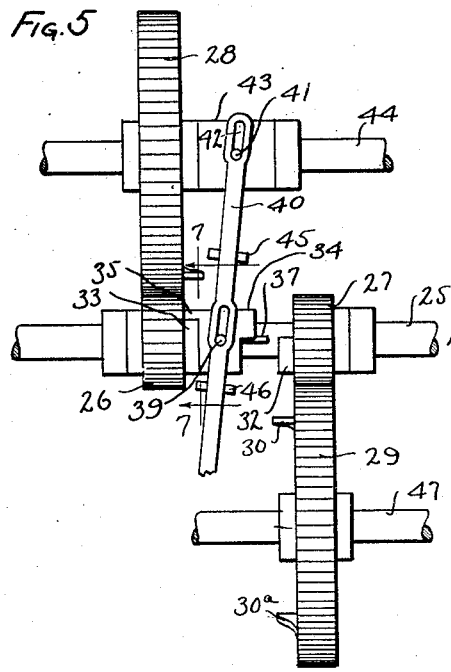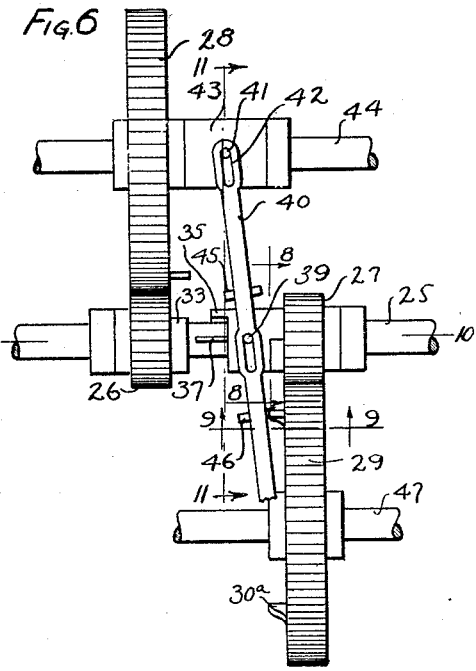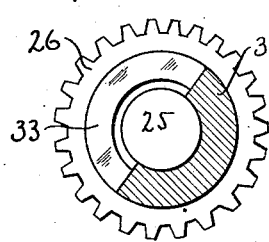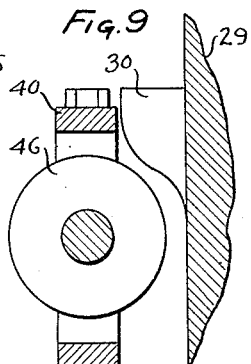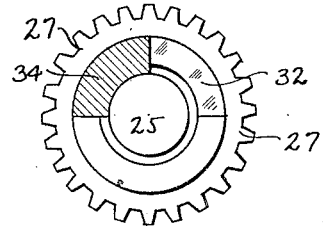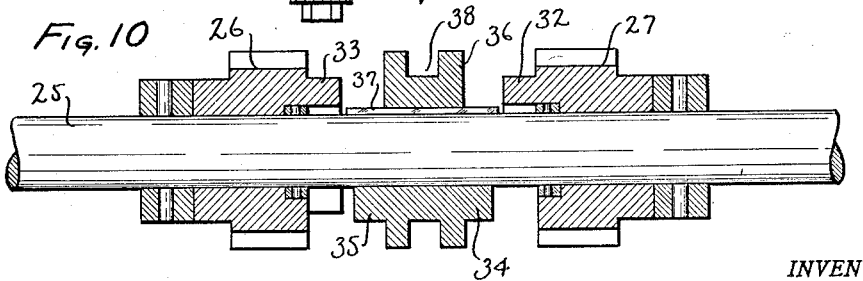

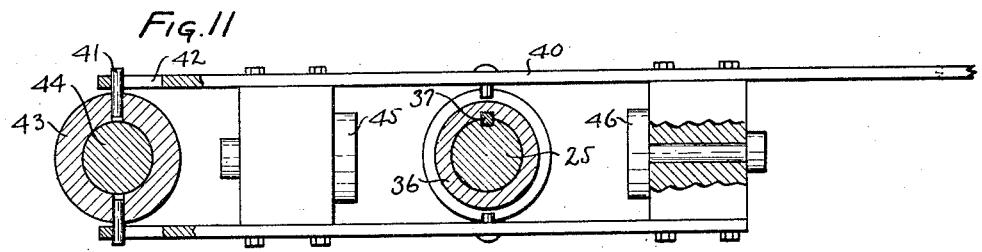
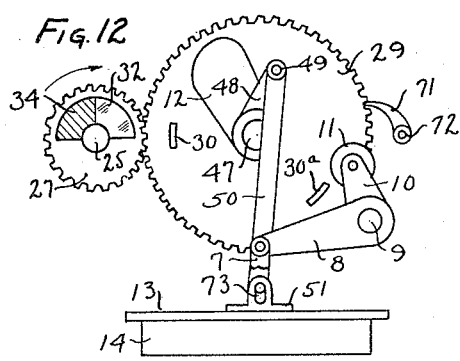
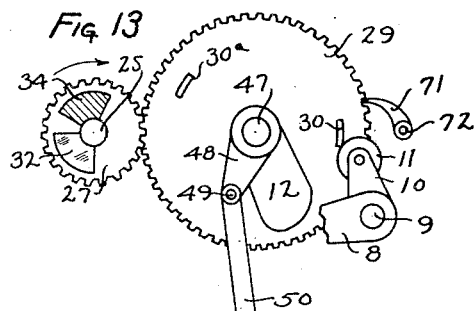
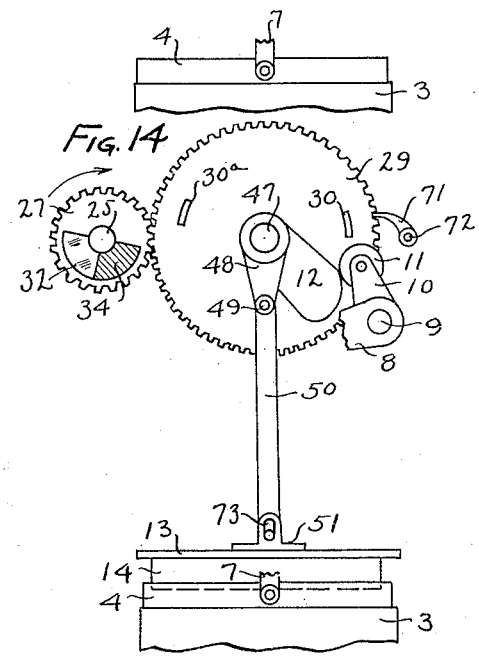
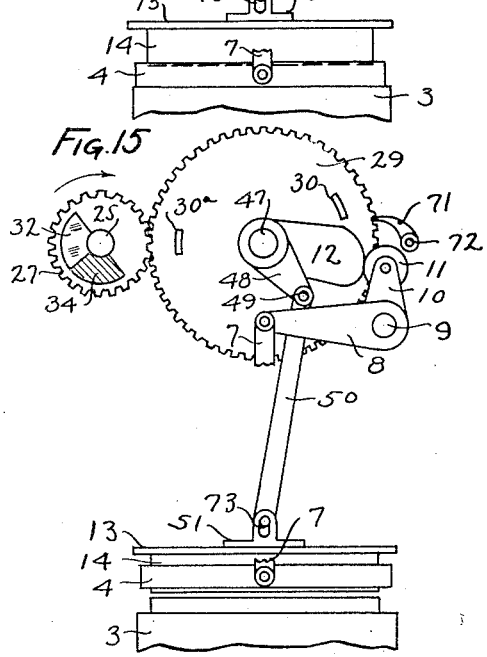

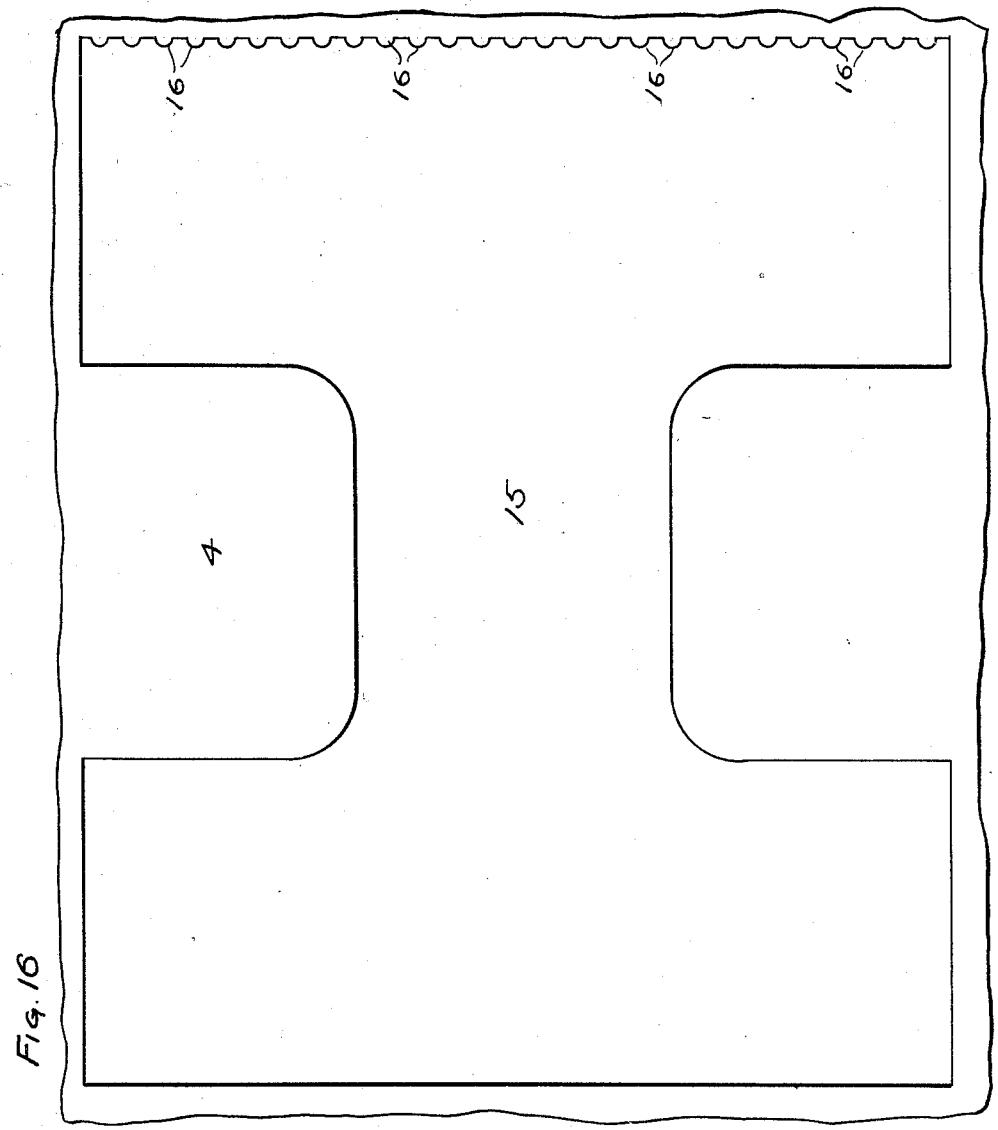
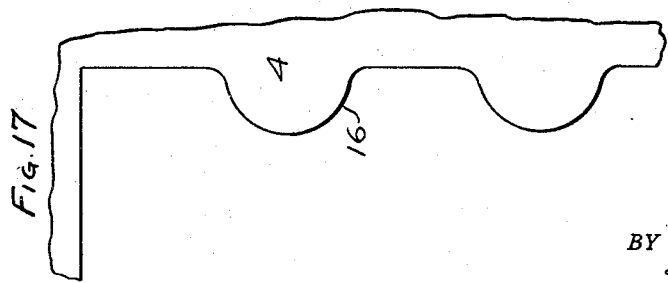

Oct. 14, 1930.   E. R. MARTIN   1,778,222
MACHINE FOR MAKING BUILDING MATERIALS
Filed Aug. 2, 1928   12 Sheets-Sheet 8
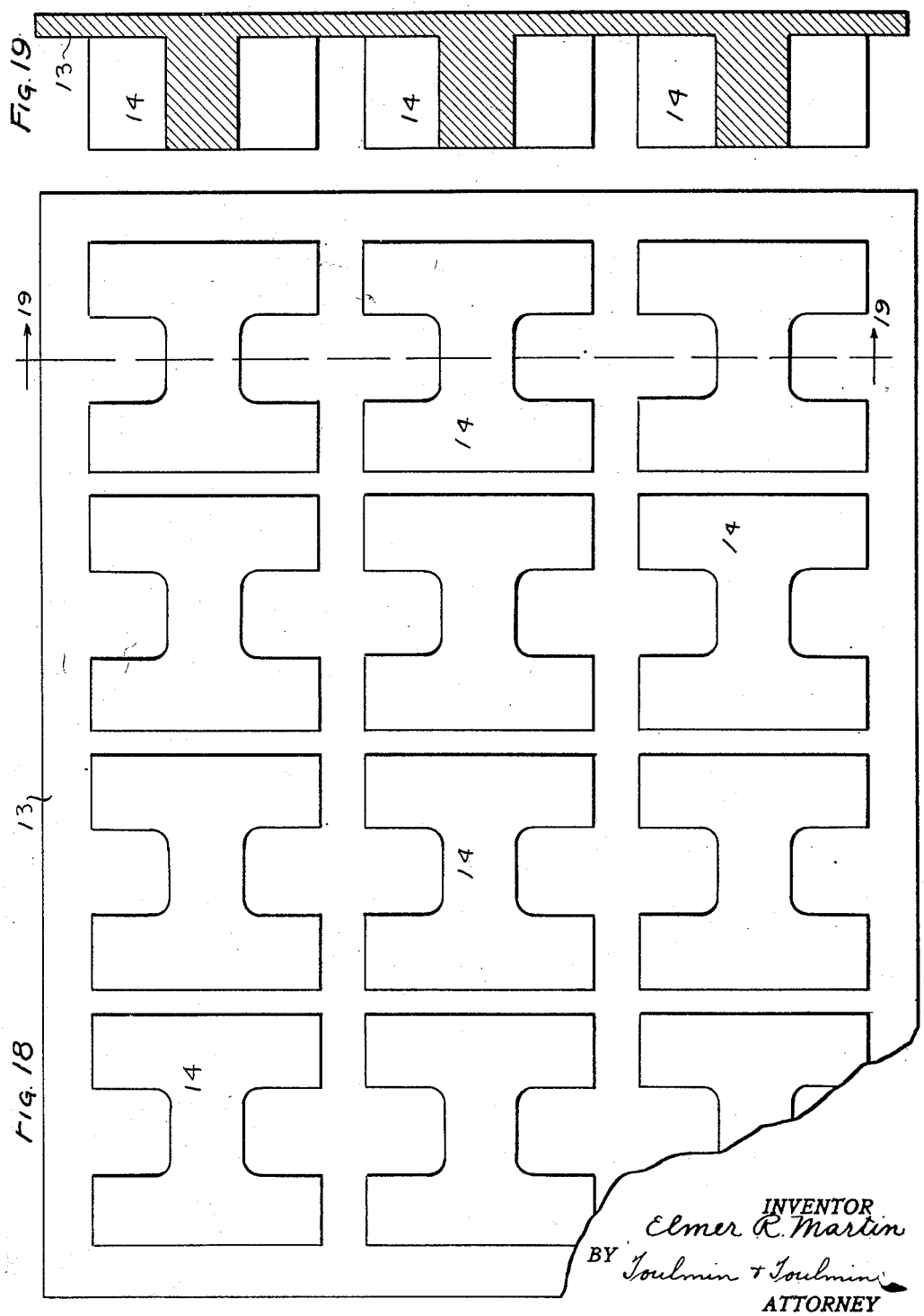

Oct. 14, 1930.    E. R. MARTIN    1,778,222
MACHINE FOR MAKING BUILDING MATERIALS
Filed Aug. 2, 1928    12 Sheets-Sheet 9
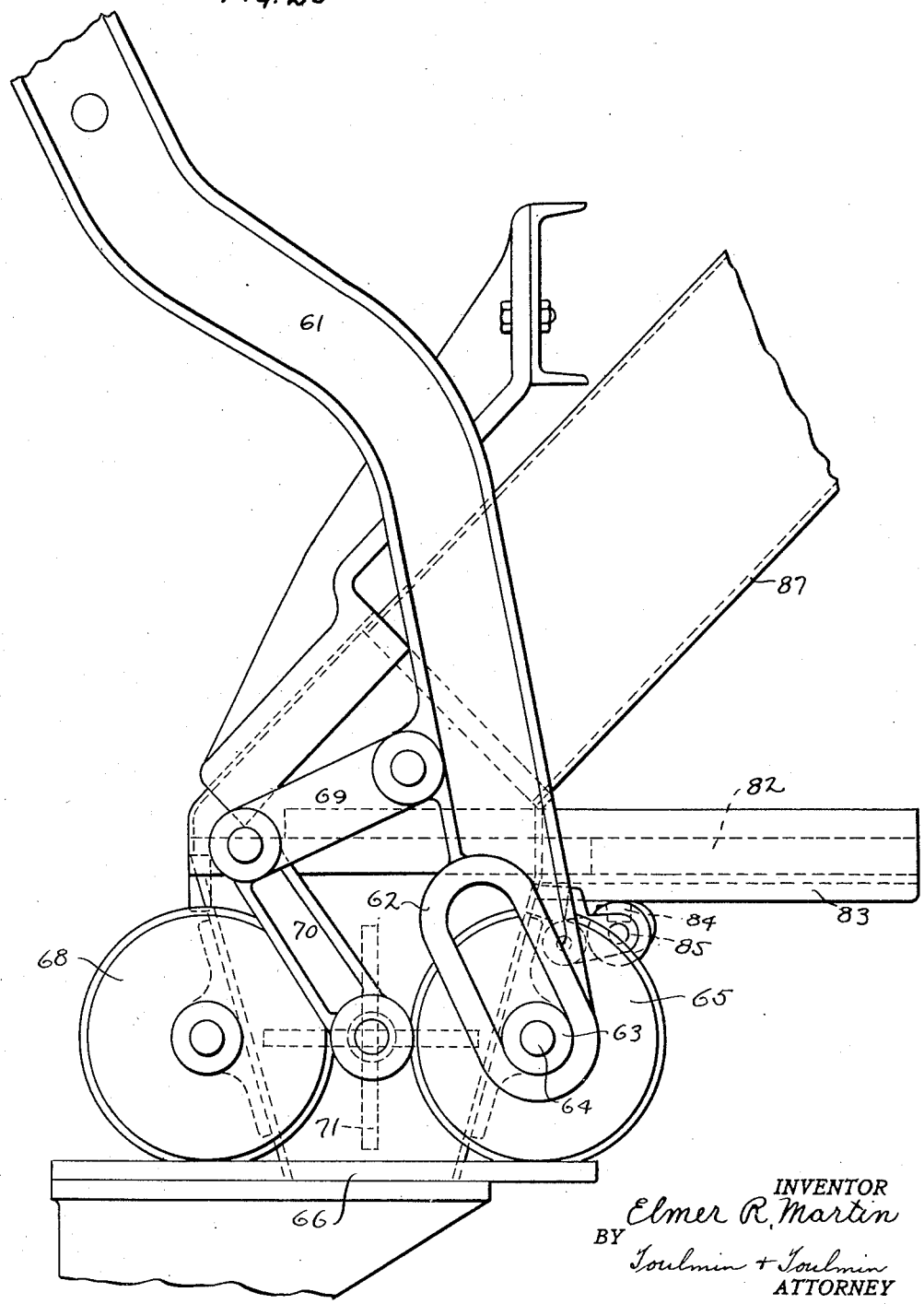

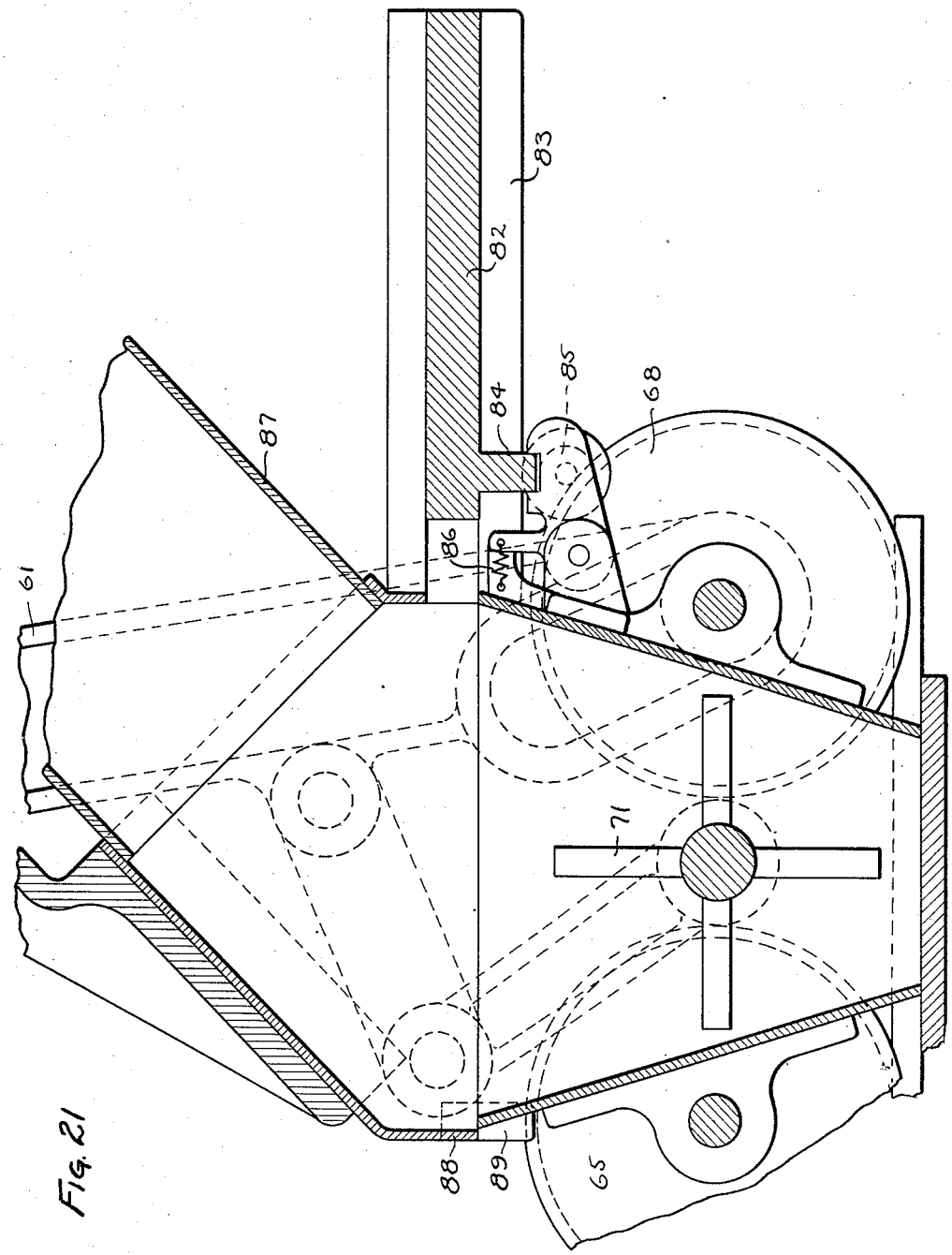

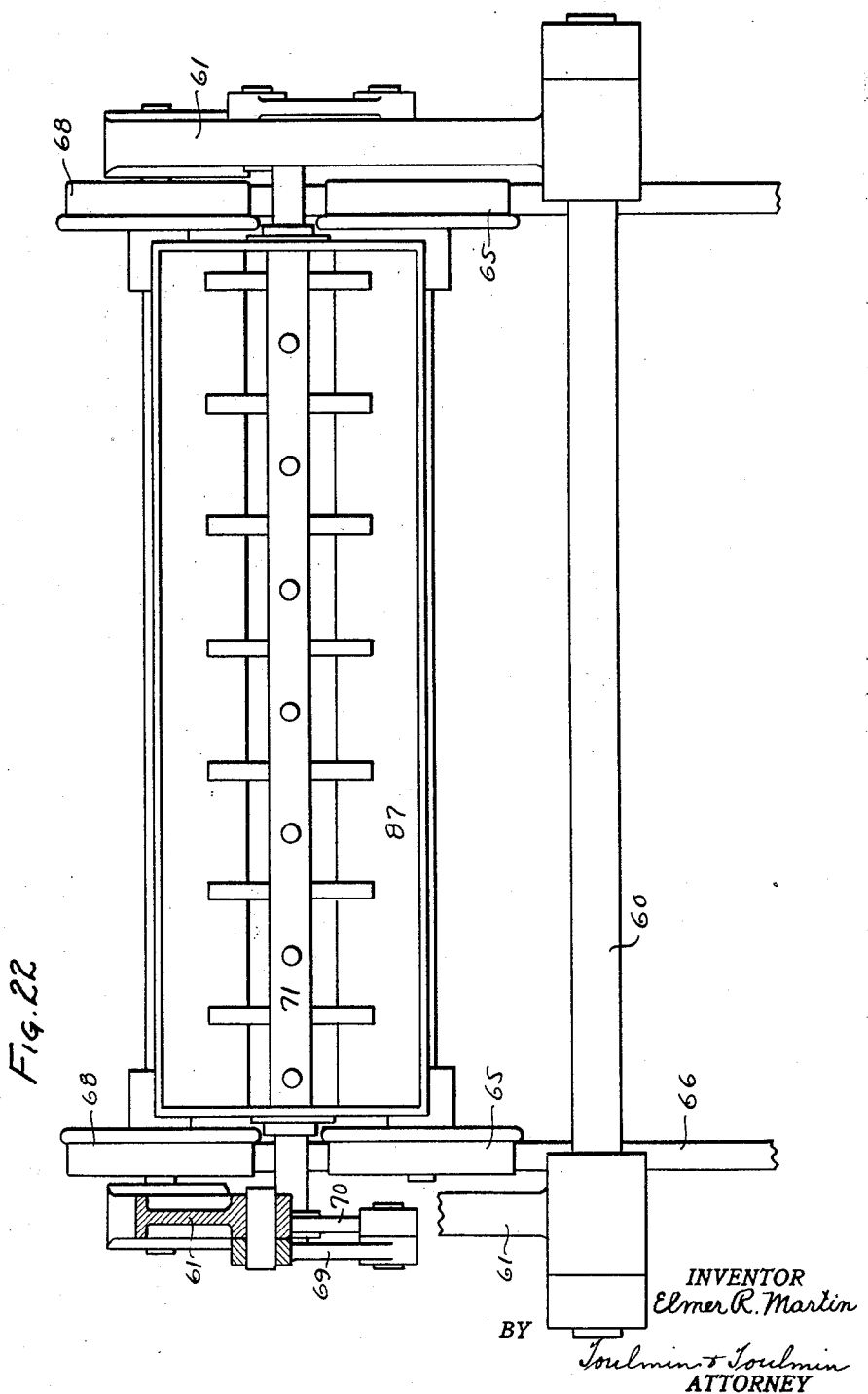

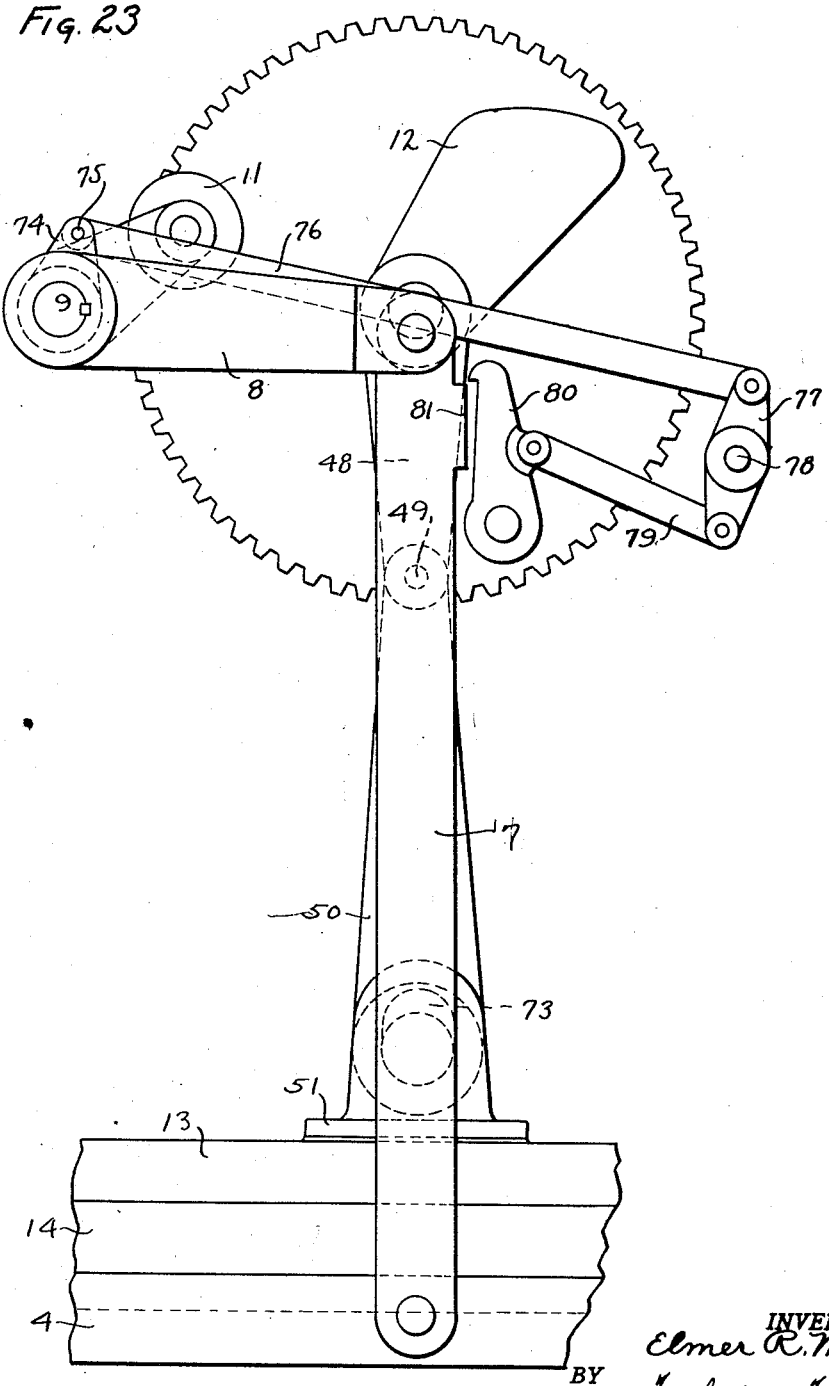

Patented Oct. 14, 1930

1,778,222

UNITED STATES PATENT OFFICE

ELMER R. MARTIN, OF SPRINGFIELD, OHIO, ASSIGNOR TO CEMROC, INC., OF CINCINNATI, OHIO, A CORPORATION OF OHIO

MACHINE FOR MAKING BUILDING MATERIALS

Application filed August 2, 1928. Serial No. 297,029.

My invention relates to machines for making plastic building materials under pressure.

It is the object of my invention to provide a machine for making building units, preferably H shaped, by the combined action of pounding and pressure which I have found produces a product of a new and distinct type.

It is my object to eliminate the necessity for machines of great strength where pressure alone is applied.

It is my object to eliminate machines which must employ tampers of great weight where tamping alone is applied.

I find by my machine that I secure a novel result with minimum expense and weight of the machine and with consequent rapidity of operation.

It is my further object to secure a machine in which the plastic material will be quickly distributed in the molds prior to the application of the final pressure thereto securing a more homogeneous product and a more even size in dimension with a definite controllable factor of absorption and structural strength.

Referring to the drawings:

Figure 1 is a front elevation of the machine;

Figure 2 is a top plan view;

Figure 3 is a view on the right hand side of the machine;

Figure 4 is a view from the left side of the machine;

Figure 5 is a detail plan view of the mechanism in position for operating the loading mechanism;

Figure 6 is a similar view in position for operating the punch mechanism;

Figure 7 is a section on the line 7—7 of Figure 5;

Figure 8 is a section on the line 8—8 of Figure 6;

Figure 9 is a section on the line 9—9 of Figure 6;

Figure 10 is a section on the line 10—10 of Figure 6;

Figure 11 is a section on the line 11—11 of Figure 6;

Figure 12 shows the upper die in rest position while the mold is being filled;

Figure 13 is a similar view showing the die in dropped position;

Figure 14 is a similar view showing the die in compressed position;

Figure 15 is a similar view showing the die and mold in stripped position;

Figure 16 is a plan view of the mold;

Figure 17 is an enlarged detail view of the mold edge;

Figure 18 is a plan view of the punch;

Figure 19 is a section on the line 19—19 of Figure 18;

Figure 20 is a side elevation of the hopper feeding mechanism;

Figure 21 is a vertical section therethrough;

Figure 22 is a plan view thereof;

Figure 23 is a detail view of the mold stripping mechanism and mold lock.

Referring to the drawings in detail, 1 indicates the vertical frame members. These frame members are provided with transverse supporting frame 2 on which is mounted a pallet 3. Upon this pallet are formed the plastic articles.

4 indicates a mold box which rests upon the pallet. This mold box reciprocates a slight distance from the top of the pallet upwardly and back again to permit of the molded articles being stripped from the mold box and to permit the molded articles to be moved out of the machine on the pallet.

The mold box is provided with ears 5 which are guided on the standards 6. The mold box is lifted by the pitman 7 that is connected to the arm 8 mounted on the shaft 9. This arm 8 is one-half of a bell crank, the other half of which is designated 10 carrying a cam roller 11. The cam 12 engages this roller which serves to lift it a short distance to strip it from the molded products. A punch plate 13 is provided having punch members 14 which project into the cavities 15 of the mold box 4. The mold box is provided with corrugations on one side designated 16 for giving a rough edge to the product.

The punch is provided with arms 17 having eyes 18 which travel on the standards 6. The upper frame members 19 are provided with transverse I-beams 20. Power is delivered to the machine through the pulley 21 which drives the shaft 22 and the pinion 23. This pinion 23 in turn drives the gear 24 on the shaft 25. The shaft 25 has mounted on it two pinions designated 26 and 27.

The pinion 26 drives the master hopper filling box gear 28. The pinion 27 drives the master die operating gear 29. Both gears are provided with cam members, gear 29 with cams 30 and gear 28 with cams 31. This cam 30 is for the purpose of disconnecting the clutch 32 and 34 to permit the punch to drop. The cam 30$^a$ is for the purpose of disconnecting the clutches 32 and 34 at the end of a cycle of operations.

The pinions 26 and 27 are loosely mounted on the shaft 25 and have clutch faces 32 and 33 which engage with the respective clutch faces 34 and 35 on the clutch sleeve 36 that is splined by the spline 37 to the shaft 25. This sleeve 36 is provided with a groove 38 in which the pins 39 of a clutch shifting yoke are inserted. This yoke is operated by the shifting lever 40 which is pivotally mounted upon the pin 41 in its slot 42 upon the sleeve 43 that is supported by the shaft 44 that also supports the gear 28.

This lever 40 is provided with a cam member 45 and a cam member 46 for engaging the cams. The shaft 47 which carries the gear 29 has attached to it a pair of arms 48 which are pivoted at 49 to the pitmen 50 that in turn are pivoted at 51 to the die plate 13. The die plate is normally maintained in elevated position by the counter weights 52 which are attached by cables 53 to the die plate 13 and are guided by the pulleys 54.

Turning to the hopper box mechanism, the shaft 44 likewise carries an arm 55 pivoted at 56 to the pitman 57 which is pivoted at 58 to the arm 59 on the shaft 60. This shaft carries the hopper box arms 61, the lower ends of which are provided with slots 62 engaging the rollers 63 on the ends of the shaft 64 that support the wheels 65 running on the track 66. These wheels in turn through the shaft 64 support the hopper box 67. The forward end of the box is supported on the wheels 68 which run on the same track 66. The links 69 and 70 serve to reciprocate the stirrer 71.

Method of operation

The successive steps to be accomplished in the operation of the machine are as follows:

(1) Load the mold box with the pallet in position and with the mold box lowered, at which time the punch is in its elevated position.

(2) Remove the charging hopper allowing it to receive another charge for the next loading operation.

(3) Move the machine so that it will permit the punch to drop into engagement with the molded material to spread it and initially condense it in the mold box.

(4) Apply pressure upon the punch to finally condense and compress the molded product, holding it in compressed position for an interval to allow it to set.

(5) Strip the mold box and lift it while still holding the punch in position.

(6) Lift the punch while the mold box is in its elevated position and withdraw the molded articles on the pallet and insert a new pallet.

(7) Lower the mold box in position for another operation.

To accomplish these successive steps I apply power to the pulley 21 so that the shaft 25 will operate continuously. I then grasp the lever 40 pressing it backwardly and moving it laterally so that the shiftable cam and cam sleeve will engage with the cam 33 thus connecting the power to the loading gear 28 which results in the movement of 44, 55, 56, 57, 58, 59, 60, and 61 and the hopper box 67 moving the box over the mold discharging the contents of the box therein and returning the box to its initial position. At this point the loading mechanism is rendered inoperative by the engagement of the cam 45 with the cam 31 which throws the lever to neutral position and disconnects the clutch members 33 and 35.

I then start the tamping and pressing operation by pressing the lever backwardly and laterally to cause the clutch members 32 and 34 to engage so that the gear 27 and gear 29 rotate. I also pull the lever forwardly so that the cams 46 and 30 will engage at an appropriate time for disconnecting the clutches 32 and 34. The result of this rotation is to first allow the punch to drop from the position shown in Figure 12 to the position shown in Figure 13 causing the clutches 32 and 34 to pass by each other. The continued downward movement of the punch then continues for the final pressing and holding of the molded product while the stripping takes place. The gear 29 is held in position through this operation by the pawl 71 pivoted at 72 on the frame 19.

Due to the slotted connection at 73 between the punch pitman 50 and the punch plate 13 the pitman can continuously move without lifting the punch over a short period through which time the stripping of the mold starts, as will be seen in Figure 14. This continues until the upper end of the slot 73 is reached when both the punch and the mold box will be lifted together so as to permit of the withdrawal of the pallet with the molded products on it. The pawl holds the gear 29 from reverse movement.

This movement continues until the cam 46 is engaged by the cam 30 which throws the lever back in its original neutral position.

If desired, as shown in Figure 23, the lock for the mold box is provided to hold it down consisting of an arm 74 which is pivoted at 75 to a pitman 76 which in turn is pivoted to a lever 77 pivoted at 78 to a link 79 that is connected to a locking pawl 80 which engages with a shoulder 81 on the mold box pitman 7. It will be noted in Figures 12, 13, 14 and 15 that I have shown the bell crank and cam roller and cam of the mold stripping apparatus in the opposite sides from that shown in other views. It does not make any difference where it is placed and I have shown it for the purpose of clearness so as not to interfere with the operation of the pinion and cams necessary to the operation of this mechanism.

The hopper mechanism is provided with the following cut-off arrangement for insuring a complete charge to the hopper box at each reciprocatory movement.

This consists of a slide 82 carried in guide ways 83. This slide has a depending shoulder 84 connected to a pivoted latch finger 85 that is carried on the hopper box and is maintained in latching position by the spring 86. Thus, as the hopper box moves forward the slide 82 cuts off the supply chute 87 from further supply. When the cut off 82 reaches the limit of its movement at 88, the latch 85 is disconnected from the shoulder 84 by the depending lug 89 so that the mold box can continue to travel forward with the mold and discharge its contents.

It will be understood that I desire to comprehend within my invention such modifications as may be necessary to adapt it to varying conditions and uses.

Having thus fully described my invention, what I claim as new and desire to secure by Letters Patent, is:

1. In a plastic material molding machine, a pallet, a continuously operating means, a power shaft, a shiftable clutch mounted thereon and turning therewith, pinions loosely mounted on said shaft, a punch gear and associated mechanism meshing with one of said pinions, a hopper charging gear and associated mechanism driven by the other of said pinions, said hopper gear having a single cam, said punch gear having two spaced cams, a shifting lever for said clutch on the power shaft, cam members on said shifting lever for engaging the cams on the gears, said lever being so mounted as to be able to move fore and aft and laterally.

2. In a plastic material molding machine, a pallet, a continuously operating means, a power shaft, a shiftable clutch mounted thereon and turning therewith, pinions loosely mounted on said shaft, a punch gear and associated mechanism meshing with one of said pinions, a hopper charging gear and associated mechanism driven by the other of said pinions, said hopper gear having a single cam, said punch gear having two spaced cams, a shifting lever for said clutch on the power shaft, cam members on said shifting lever for engaging the cams on the gears, said lever being so mounted as to be able to move fore and aft and laterally, a mold box, means connected thereto for elevating said mold box comprising a pitman bell crank and cam roller, a cam associated with the punch gear moving therewith for engaging said roller to elevate said box at intervals.

3. In a plastic material molding machine, a pallet, a continuously operating means, a power shaft, a shiftable clutch mounted thereon and turning therewith, pinions loosely mounted on said shaft, a punch gear and associated mechanism meshing with one of said pinions, a hopper charging gear and associated mechanism driven by the other of said pinions, said hopper gear having a single cam, said punch gear having two spaced cams, a shifting lever for said clutch on the power shaft, cam members on said shifting lever for engaging the cams on the gears, said lever being so mounted as to be able to move fore and aft and laterally, and means to prevent the backward movement of the punch gear.

4. In a machine for molding plastic material, a pallet, a mold box, a punch, power means for moving the mold box and the punch, a single control lever for intermittently connecting the power means or the means for elevating the mold box and the punch means for disconnecting said means from the power means to permit the punch to drop, and means for disconnecting the punch and mold box from their elevating means at the end of the cycle of operations whereby the mold box is left in lowered position and the punch is left in elevated position, and means for maintaining the punch in elevated position.

5. In a machine for molding plastic material, a pallet, a mold box, a punch, power means for moving the mold box and the punch, a single control lever for intermittently connecting the power means or the means for elevating the mold box and the punch means for disconnecting said means from the power means to permit the punch to drop, means for disconnecting the punch and mold box from their elevating means at the end of the cycle of operations whereby the mold box is left in lowered position and the punch is left in elevated position, means for maintaining the punch in elevated position, mold box charging mechanism, means for driving it from said common power means, means for connecting it to said common power means through said control lever and means associated therewith for disconnecting it from the power means at the end of the cycle of the loading operation.

6. In a plastic material molding machine, a power shaft, spaced pinions loosely mounted thereon, cams on said pinions, a shiftable cam on said shaft for alternately engaging said pinions, a shifting lever therefor, spaced cams on said gear for engaging one of the knock out cams on the lever, a charging hopper gear, a knock out cam thereon.

7. In a plastic material molding machine, a power shaft, spaced pinions loosely mounted thereon, cams on said pinions, a shiftable cam on said shaft for alternately engaging said pinions, a shifting lever therefor, spaced cams on said gear for engaging one of the knock out cams on the lever, a charging hopper gear, a knock out cam thereon, a stripping cam mounted to turn with said punch gear, and means connected to said gear for moving a punch, and means adapted to be operated by the stripping cam for operating the mold.

In testimony whereof, I affix my signature.

ELMER R. MARTIN.